(12) United States Patent
Wang

(10) Patent No.: US 10,312,775 B2
(45) Date of Patent: Jun. 4, 2019

(54) INTEGRATED CONTAINER-TYPE TORQUE-DRIVEN ELECTRIC SENSOR FOR A VEHICLE MOTOR

(71) Applicant: WUXI HIGH MINDED INDUSTRIAL DESIGN CO., LTD., Wuxi, Jiangsu (CN)

(72) Inventor: Huan Wang, Wuxi (CN)

(73) Assignee: WUXI HIGH MINDED INDUSTRIAL DESIGN CO., LTD., Wuxi, Jiangsu (CN)

( * ) Notice: Subject to any disclaimer, the term of this patent is extended or adjusted under 35 U.S.C. 154(b) by 283 days.

(21) Appl. No.: 15/464,337

(22) Filed: Mar. 20, 2017

(65) Prior Publication Data

US 2017/0194843 A1 Jul. 6, 2017

Related U.S. Application Data

(63) Continuation-in-part of application No. 14/352,281, filed on Apr. 16, 2014, now abandoned.

(30) Foreign Application Priority Data

Dec. 29, 2011 (CN) ..................... 2011 2 0562124 U

(51) Int. Cl.
*H02K 11/00* (2016.01)
*H02K 11/24* (2016.01)
(Continued)

(52) U.S. Cl.
CPC .............. *H02K 11/24* (2016.01); *B62J 99/00* (2013.01); *B62M 6/50* (2013.01); *B62M 6/60* (2013.01);
(Continued)

(58) Field of Classification Search
CPC ....... H02K 11/24; H02K 11/215; B62J 99/00; B62M 6/50
(Continued)

(56) References Cited

U.S. PATENT DOCUMENTS 5,369,324 A * 11/1994 Saether ................ B60K 7/0007
310/156.25
6,321,863 B1 * 11/2001 Vanjani ................ B60K 7/0007
180/206.5
(Continued)

*Primary Examiner* — Hanh N Nguyen
(74) *Attorney, Agent, or Firm* — Leong C. Lei

(57) ABSTRACT

An integrated container-type torque-driven electric sensor for a vehicle motor is provided. Disposed on a motor housing along the direction of a motor shaft is a hollow cavity formed by a ring-shaped protrusion; contained in the hollow cavity is a fixed guiding slip ring; the fixed guiding slip ring dynamically matches with a floating sensor ring assembly having ratchet teeth and a magnetic steel piece; the ratchet teeth of a flywheel mating with the cogging distributed in a ring shape in a sensor ring having ratchet teeth; disposed on the motor shaft is a Hall element, the magnetic steel piece cooperating with the Hall element by means of magnetic induction, thereby outputting an electric signal to control a vehicle to enhance the force for rotation. For this motor, all Hall elements are disposed on the motor's housing, thereby solving the conflict between functional configurations and limited accommodation, and enabling significant magnetic induction effects.

10 Claims, 2 Drawing Sheets

(51) Int. Cl.
*B62M 6/50* (2010.01)
*B62J 99/00* (2009.01)
*B62M 6/60* (2010.01)
*H02K 11/215* (2016.01)
*G01L 1/00* (2006.01)

(52) U.S. Cl.
CPC ....... *H02K 11/215* (2016.01); *B62J 2099/002* (2013.01); *G01L 1/00* (2013.01)

(58) Field of Classification Search
USPC .............................................. 310/68 B, 68 C
See application file for complete search history.

(56) References Cited

U.S. PATENT DOCUMENTS

| | | | | |
|---|---|---|---|---|
| 2006/0244319 | A1* | 11/2006 | Guo | B60K 7/0007 310/68 B |
| 2009/0236921 | A1* | 9/2009 | Karsch | H02K 5/225 310/71 |
| 2014/0035444 | A1* | 2/2014 | Jung | H02K 11/215 310/68 B |
| 2014/0103783 | A1* | 4/2014 | Vogler | B60B 27/0068 310/68 B |

\* cited by examiner

INTEGRATED CONTAINER-TYPE TORQUE-DRIVEN ELECTRIC SENSOR FOR A VEHICLE MOTOR

This is a continuation-in-part of co-pending U.S. patent application Ser. No. 14/352,281 filed on Apr. 16, 2014 and owned by the present applicant.

BACKGROUND OF THE INVENTION

(a) Technical Field of the Invention

The present invention relates to a vehicle electric transmission, and more particularly to a torque-driven electric sensor which generates signals to a vehicle motor to improve the motor's work.

(b) Description of the Prior Art

In the field of electric sensors for motors of bikes, Chinese Patent Application No. 201110125438.9 discloses "ELECTRIC POWER SENSOR STRUCTURE COOPERATING WITH REAR FORK OF BIKE". The bottom of one side of the rear fork of the bike has a trough. A circuit board installed with Hall elements is fixed in the recess. The recess is further provided with a sensor which passes through a slot of the bottom of the recess and is disposed on a movable rear shaft. A permanent magnet is provided on the sensor to cooperate with the Hall elements on the circuit board. The rear shaft is confined to move within the slot of the bottom of the recess. By using movement of the rear shaft, the permanent magnet which is fixed relative to the rear shaft and the Hall elements generate a change of magnetic induction to output an electric signal to control the motor of the bike to enhance the force for rotation. The Hall sensor of this structure adopts a mechanical way. The working principle is that the acceleration force got by the Hall sensor which is separate from the motor when riding the bike is converted to an electrical signal used to drive the motor to enhance the force for driving. It is obvious that the motor and the Hall sensor of this structure are disposed separately. This reduces the reliability of the sensor's signal and the production cost in manufacturing is more likely to increase. Thus, it is necessary to design an electric sensor for vehicle motors, which operates in combination with Hall elements to fit the various demands of the current market.

Accordingly, the inventor of the present invention has devoted himself based on his many years of practical experiences to solve this problem.

SUMMARY OF THE INVENTION

The primary object of the present invention is to provide a standardized integrated container-type torque-driven electric sensor, which generates signals for a vehicle motor, applicable to a vehicle designed with the transmission function and drive function combined in one.

In order to achieve the aforesaid object, the integrated container-type torque-driven electric sensor for a vehicle motor of the present invention comprises a motor shaft and a motor casing disposed on the motor shaft. The motor shaft is provided with a flywheel for driving. The motor casing has a ring-shaped protrusion around the motor shaft to form a hollow cavity. The hollow cavity is to accommodate a fixed guiding slip ring. The fixed guiding slip ring movably cooperates with a floating ratchet sensor ring assembly provided with a magnetic steel piece. The floating ratchet sensor ring assembly comprises a ratchet sensor ring. The flywheel has ratchet teeth to match with an annular toothed trough disposed in the ratchet sensor ring. The motor shaft is further provided with a Hall element. The magnetic steel piece on the floating ratchet sensor ring assembly cooperates with the Hall element by means of magnetic induction, thereby outputting an electric signal to control a vehicle motor to improve its work for rotation.

The present invention can achieve the following effects:

When a rider accelerates the bike to run down from a standstill, he/she treads to enhance the force to bring the ratchet teeth of the flywheel to transmit the force to the ratchet sensor ring, and then to bring the floating ratchet sensor ring assembly to move horizontally relative to the fixed guiding slip ring. The magnetic steel piece on the floating ratchet sensor ring assembly and the Hall element disposed on the motor shaft generate a relative displacement to generate an electric signal of a drive command after the signal is processed by the microcomputer of the sensor. The vehicle is then driven by an added auxiliary force. When the vehicle decelerates or goes downhill, the floating ratchet sensor ring is restored to its original place and the microcomputer of the sensor outputs a "cut-off" signal.

Preferably, the floating ratchet sensor ring assembly comprises the ratchet sensor ring, an elastic return member cooperating with the ratchet sensor ring, and an end cap rotatably connected with the fixed guiding slip ring. After the elastic return member is positioned on the ratchet sensor ring, the end cap is configured to limit the elastic return member and the ratchet sensor ring on the fixed guiding slip ring. Therefore, the outer surface of the motor is relatively fixed and the inner cavity is in a movable state, which is beneficial to generate a magnetic induction to output a signal to improve the work of the vehicle motor.

Preferably, the bottom of the inner wall of the fixed guiding slip ring has a plurality of inclined recesses and balls which are equally arranged circumferentially. The bottom of the ratchet sensor ring is located on the balls. When the ratchet sensor ring is driven by a tangential force, the ratchet sensor ring brings the balls to roll back and forth on inclined surfaces of the inclined recesses.

Preferably, the ratchet sensor ring is formed with a plurality of installation troughs which are equally arranged circumferentially.

Preferably, the elastic return member is a polyurethane soft member. Preferably, the polyurethane soft member has a plurality of successive gaps thereon.

Preferably, the motor shaft has a positioning groove for the Hall element.

Preferably, the magnetic steel piece is coaxially mounted on the ratchet sensor ring. After the floating ratchet sensor ring assembly is installed in position, the magnetic steel piece corresponds in position to the magnetic induction of the Hall element, which is beneficial to get a better magnetic induction effect to improve the sensitivity and reliability of magnetic induction, preventing signals from distortion.

The present invention has the Hall sensor elements disposed directly on the motor's casing to have the torque-driven electric sensor formed with the vehicle motor to solve the conflict between configuration of parts with different functions and limitations in available space. The degree of standardization is high. The sensor so designed for a vehicle motor can be used widely. The present invention has significant magnetic induction effects, is beneficial for inten-

DETAILED DESCRIPTION OF THE PREFERRED EMBODIMENTS

Embodiments of the present invention will now be described, by way of example only, with reference to the accompanying drawings.

Figure 1:
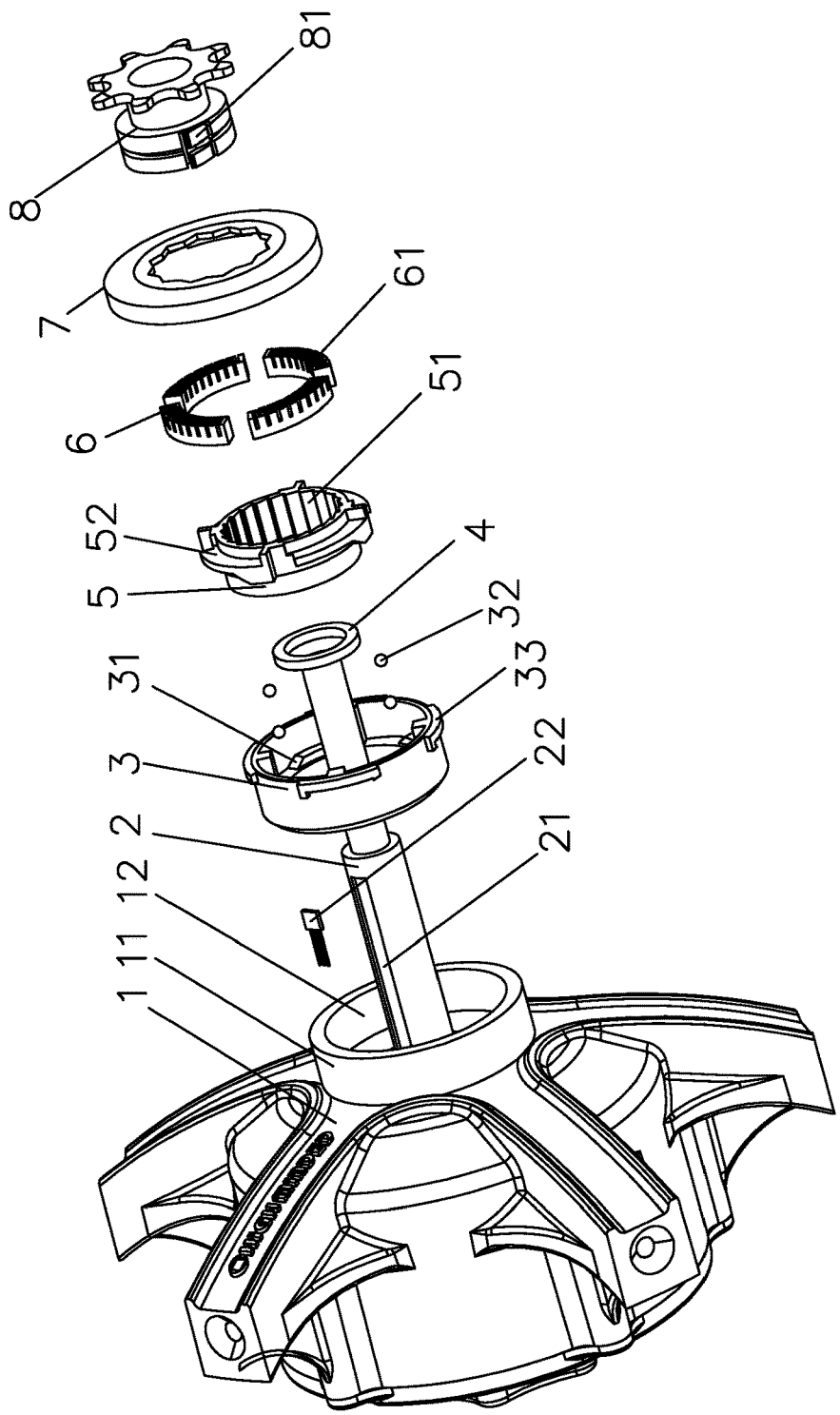
FIG. 1 is an exploded view according to a preferred embodiment of the present invention.
Figure 2:
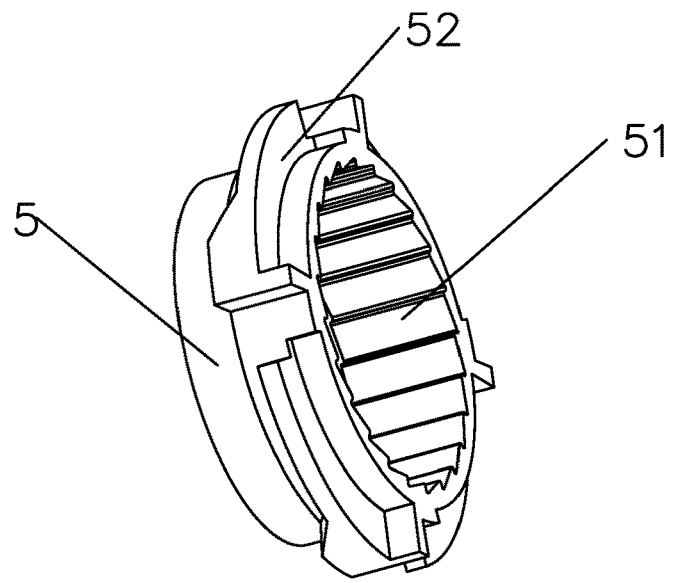
FIG. 2 is an enlarged view showing the ratchet sensor ring of FIG. 1.
Figure 3:
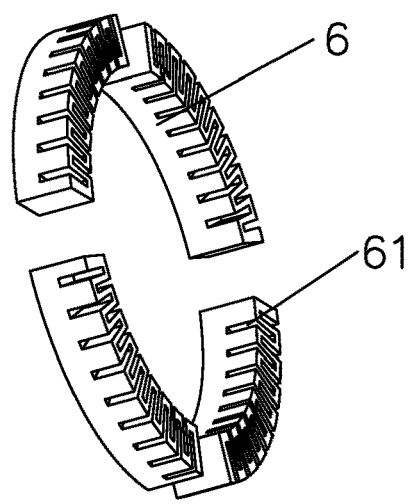
FIG. 3 is an enlarged view showing the polyurethane soft member of FIG. 1.

As shown in FIG. 1 to FIG. 3, the present invention discloses an integrated container-type torque-driven electric sensor for a vehicle motor. The integrated container-type torque-driven sensor for a vehicle motor according to a preferred embodiment of the present invention comprises a motor shaft 2 and a motor casing 1 disposed on the motor shaft 2. The motor shaft 2 is provided with a flywheel 8 for driving. The motor casing 1 has a ring-shaped protrusion 11 around the motor shaft 2 to form a hollow cavity 12. The hollow cavity 12 is adapted to accommodate and install a fixed guiding slip ring 3. A floating ratchet sensor ring assembly comprises of a ratchet sensor ring 5, an elastic return member 6 cooperating with the ratchet sensor ring 5, and an end cap 7 rotatably connected with the fixed guiding slip ring 3. After the elastic return member 6 is positioned on the ratchet sensor ring 5, the end cap 7 is configured to limit the elastic return member 6 and the ratchet sensor ring 5 on the fixed guiding slip ring 3. The end cap 7 has a recess to match with a connecting ear 33 of the fixed guiding slip ring 3, not shown in FIG. 1. For an electric sensor for a vehicle motor, this configuration that the outer surface of the motor is relatively fixed and the inner cavity is in a movable state is beneficial to generate a magnetic induction to output a signal to enhance the work of the vehicle motor. The elastic ratchet sensor ring assembly provided with a magnetic steel piece 4 and the fixed guiding slip ring 3 perform a movable cooperation, namely, the ratchet sensor ring 5 to generate electromagnetic induction is confined in the fixed guiding slip ring 3 to do a translational motion. The flywheel 8 has ratchet teeth 81 to match with an annular toothed trough 51 disposed in the ratchet sensor ring 5 for transmitting an external force to drive the motor. The motor shaft 2 has a positioning groove 21 provided with a Hall element 22. The magnetic steel piece 4 on the floating ratchet sensor ring assembly cooperates with the Hall element 22 by means of magnetic induction, thereby outputting an electric signal to control a vehicle's motor to improve the work for rotation.

The bottom of the inner wall of the fixed guiding slip ring 3 has a plurality of inclined recesses 31 and balls 32 which are equally arranged circumferentially. The bottom of the ratchet sensor ring 5 is located on the balls 32. When the ratchet sensor ring 5 is driven by a tangential force, the ratchet sensor ring 5 will bring the balls 32 to roll back and forth on the inclined surfaces of the inclined recesses 31.

The ratchet sensor ring 5 is formed with a plurality of installation troughs 52 which are equally arranged circumferentially.

The elastic return member 6 is a polyurethane soft member, and has a plurality of successive gaps 62 thereon. By the restoring force of the polyurethane soft member after deformed, the floating ratchet sensor ring assembly is returned in position.

The magnetic steel piece 4 is coaxially mounted on the ratchet sensor ring 5. After the floating ratchet sensor ring assembly is installed in position, the magnetic steel piece 4 corresponds in position to the magnetic induction of the Hall element 22, which is beneficial to get a better magnetic induction effect to improve the sensitivity of magnetic induction, preventing signals from distortion.

The following description is an embodiment of the present invention. A foldable tread and power dual-purpose bike is provided with an electronic sensor for the vehicle motor. The motor is installed on the rear shaft of the bike. The display screen of the sensor is disposed on the bike handle. When the rider applies a force to drive the flywheel, the ratchet sensor ring 5 of the elastic ratchet sensor ring assembly turns over the balls 32 along the inclined surfaces of the inclined recesses 31 so as to change the horizontal displacement route of the ratchet sensor ring to cut off the magnetic lines. The magnetic steel piece 4 on the elastic ratchet sensor ring assembly and the Hall element 22 on the motor shaft 2 would then generate a magnetically induced signal to the motor to increase the power of the motor after the signal is processed by the microcomputer of the sensor. The motor's work is improved. In contrast, when the bike has no treading force or decelerates to go downhill, the ratchet torque sensor ring assembly will return in position by the restoring force of the polyurethane soft member. At this moment, the magnetically induced signal of the Hall element 22 and the magnetic steel piece 4 will reset to zero, and the central processing unit will send a "cut-off" (i.e. "no supplying") signal. As a result, the motor doesn't obtain an auxiliary power controlled by the sensor. Thus, the motor's power is increased only when the bike is accelerated.

In an embodiment, the present invention can use a return spring instead of the polyurethane soft member, and a return spring positioning trough or a return spring positioning hole instead of the installation troughs 52.

The axial rotation of the ratchet sensor ring 5 is changed to a horizontal displacement to change the magnetic flux, and then the change of the magnetic flux is converted to an electric signal to send out a signal to improve the power after being processed by the microcomputer disposed on the bike.

Although particular embodiments of the present invention have been described in detail for purposes of illustration, various modifications and enhancements may be made without departing from the spirit and scope of the present invention. Accordingly, the present invention is not to be limited except as by the appended claims.

I claim:

1. An integrated container-type torque-driven electric sensor for a vehicle motor, comprising a motor shaft and a motor casing disposed on the motor shaft, the motor shaft being provided with a flywheel for driving, the motor casing having a ring-shaped protrusion around the motor shaft to form a hollow cavity, the hollow cavity being to accommodate a fixed guiding slip ring, the fixed guiding slip ring movably cooperating with a floating ratchet sensor ring assembly provided with a magnetic steel piece, the floating ratchet sensor ring assembly comprising a ratchet sensor ring, the flywheel having ratchet teeth to match with an annular toothed trough disposed in the ratchet sensor ring, the motor shaft being provided with a Hall element, the magnetic steel piece disposed on the floating ratchet sensor ring assembly cooperating with the Hall element by means of magnetic induction, thereby outputting an electric signal to control the motor of a vehicle and to increase power for rotation.

2. The integrated container-type torque-driven electric sensor for a vehicle motor as claimed in claim 1, wherein a bottom of an inner wall of the fixed guiding slip ring has a plurality of inclined recesses and balls which are equally arranged circumferentially, a bottom of the ratchet sensor ring is located on the balls, when the ratchet sensor ring is driven by a tangential force, the ratchet sensor ring brings the balls to roll back and forth on inclined surfaces of the inclined recesses.

3. The integrated container-type torque-driven electric sensor for a vehicle motor as claimed in claim 1, wherein the ratchet sensor ring is formed with a plurality of installation troughs which are equally arranged circumferentially.

4. The integrated container-type torque-driven electric sensor for a vehicle motor as claimed in claim 1, wherein the floating ratchet sensor ring assembly comprises the ratchet sensor ring, an elastic return member cooperating with the ratchet sensor ring, and an end cap rotatably connected with the fixed guiding slip ring, after the elastic return member is positioned on the ratchet sensor ring, the end cap is configured to limit the elastic return member and the ratchet sensor ring on the fixed guiding slip ring.

5. The integrated container-type torque-driven electric sensor for a vehicle motor as claimed in claim 4, wherein a bottom of an inner wall of the fixed guiding slip ring has a plurality of inclined recesses and balls which are equally arranged circumferentially, a bottom of the ratchet sensor ring is located on the balls, when the ratchet sensor ring is driven by a tangential force, the ratchet sensor ring brings the balls to roll back and forth on inclined surfaces of the inclined recesses.

6. The integrated container-type torque-driven electric sensor for a vehicle motor as claimed in claim 4, wherein the ratchet sensor ring is formed with a plurality of installation troughs which are equally arranged circumferentially.

7. The integrated container-type torque-driven electric sensor for a vehicle motor as claimed in claim 4, wherein the elastic return member is a polyurethane soft member.

8. The integrated container-type torque-driven electric sensor for a vehicle motor as claimed in claim 7, wherein the polyurethane soft member has a plurality of successive gaps thereon.

9. The integrated container-type torque-driven electric sensor for a vehicle motor as claimed in claim 1, wherein the motor shaft has a positioning groove to accommodate the Hall element.

10. The integrated container-type torque-driven electric sensor for a vehicle motor as claimed in claim 1, wherein the magnetic steel piece is coaxially mounted on the ratchet sensor ring.

\* \* \* \* \*